United States Patent
Eng

(10) Patent No.: US 9,646,238 B2
(45) Date of Patent: May 9, 2017

(54) METHODS AND SYSTEMS FOR PROTECTING PERSONAL ACCOUNT INFORMATION

(71) Applicant: U. P. Peter Eng, Palo Alto, CA (US)

(72) Inventor: U. P. Peter Eng, Palo Alto, CA (US)

(*) Notice: Subject to any disclaimer, the term of this patent is extended or adjusted under 35 U.S.C. 154(b) by 0 days.

(21) Appl. No.: 15/003,622

(22) Filed: Jan. 21, 2016

(65) Prior Publication Data

US 2016/0162766 A1 Jun. 9, 2016

Related U.S. Application Data

(63) Continuation of application No. 14/222,534, filed on Mar. 21, 2014, now abandoned, which is a continuation of application No. 13/669,312, filed on Nov. 5, 2012, now Pat. No. 8,678,288, which is a continuation of application No. 12/731,126, filed on Mar. 24, 2010, now Pat. No. 8,302,858.

(60) Provisional application No. 61/163,015, filed on Mar. 24, 2009.

(51) Int. Cl.
| | |
|---|---|
| *G06K 5/00* | (2006.01) |
| *G06K 19/06* | (2006.01) |
| *G06K 19/00* | (2006.01) |
| *G06K 19/08* | (2006.01) |
| *G07F 7/08* | (2006.01) |
| *B32B 37/12* | (2006.01) |
| *G06Q 20/34* | (2012.01) |

(52) U.S. Cl.
CPC ........ *G06K 19/06196* (2013.01); *B32B 37/12* (2013.01); *G06K 19/005* (2013.01); *G06K 19/08* (2013.01); *G06Q 20/34* (2013.01); *G07F 7/0806* (2013.01); *Y10T 156/10* (2015.01)

(58) Field of Classification Search
USPC ............... 235/380, 382, 486; 705/39, 41
See application file for complete search history.

(56) References Cited

U.S. PATENT DOCUMENTS

| | | | | |
|---|---|---|---|---|
| 6,845,863 B1* | 1/2005 | Riley | ............... | A45C 11/182 150/147 |
| 7,290,703 B2* | 11/2007 | Jacobs | ............... | G06Q 20/341 235/380 |
| 8,590,784 B1* | 11/2013 | Pernici | ............... | A45C 11/182 235/380 |
| 2006/0262655 A1* | 11/2006 | Persson | ............... | A45C 11/182 369/1 |
| 2008/0163964 A1* | 7/2008 | Brannon | ............... | A45C 11/182 150/147 |

* cited by examiner

*Primary Examiner* — Ahshik Kim

(57) ABSTRACT

The invention provides systems and methods for protecting information related to personal accounts and other kinds of information displayed on personal and identification cards. In some embodiments, the invention further provides a credit card with a card portion displaying a first part of an account number and an electronically readable region. The credit card may also include a sleeve portion that holds the card portion and that may display a second part of an account number. The sleeve portion may have a window through which the first part of the account number is visible, so that the first and second parts of the account number provide a complete valid account number.

14 Claims, 7 Drawing Sheets

METHODS AND SYSTEMS FOR PROTECTING PERSONAL ACCOUNT INFORMATION

CROSS-REFERENCE

This application is a continuation application of U.S. patent application Ser. No. 14/222,534, filed on Mar. 21, 2014, which is a continuation application of U.S. patent application Ser. No. 13/669,312, filed on Nov. 5, 2012, now issued as U.S. Pat. No. 8,678,288, which is a continuation application of U.S. patent application Ser. No. 12/731,126, filed on Mar. 24, 2010, now issued as U.S. Pat. No. 8,302,858, which claims the benefit of U.S. Provisional Application No. 61/163,015, filed Mar. 24, 2009, each of which is entirely incorporated herein by reference.

BACKGROUND OF INVENTION

The invention relates to account information security. More particularly, the invention relates to credit card security utilizing separable credit card components that are carried together and mechanically joined as needed to provide complete account information for effecting transactions.

SUMMARY OF THE INVENTION

The invention provides systems and methods for protecting information related to credit card accounts and other kinds of information displayed on personal and identification cards.

Various aspects of the invention described herein may be applied to any of the particular applications set forth below or for any other types of information displayed on account or identification cards. This includes ATM cards, gift cards, driver's licenses or any other type of card that contains personal or confidential information. The invention may be applied as a standalone system or method, or as part of an integrated fraud prevention solution. It shall be understood that different aspects of the invention can be appreciated individually, collectively, or in combination with each other.

An aspect of the invention is directed to an effective mechanical approach for enhancing credit card security by way of a multi-piece separable credit card. A new and convenient way is thus provided for typical credit card users to effectively deal with the hazards of "skimming" or the theft of credit card information thereby minimizing incidents of unauthorized credit card use.

A preferable embodiment of the invention provides a separable credit card that is mechanically detachable. It can be constructed and formed with at least two components, namely a card component and a sheath component. Both components may be carried together or separately. The sheath component may include a first portion containing an embossed or imprinted credit card account number, and the card component may contain a second portion of the credit card account number. The sheath component may be formed with a window or cut-out portion to allow display of the second portion of the credit card account number when the card component is inserted and stored therein. Accordingly, the complete credit card account number is not visible or provided when the card and sheath components are separated but available and visible when both combined.

Another aspect of the invention provides a separable credit card that may be employed with existing credit card embossing machines and electronic account access apparatus. Card components provided herein preferably include a magnetic strip that is fully functional when they are either combined or separate from their respective sheath or covering components. When both components are combined, a partial account number embossed on either component visually come together and allow viewing of the complete account number. In preferable embodiments, the sheath component may be formed with a cut-out portion, transparent window covering or other kind of opening or viewing pane that allows viewing of a partial account number appearing on the card component housed therein. The complete account number is thus provided for impressions or viewing to carry out transactions with either electronic or non-electronic, mechanical embossing style credit card swiping machines.

In preferable embodiments of the invention, separable credit cards or other kinds of personal cards carried by an individual are: formed with conventional materials and rugged in construction; economic to manufacture; and easily used by anyone without extra hassle. The card components may be easily removed and replaced from their respective coverings. For example, a covering may remain in a wallet, card purse or other credit card holding device so that "complete" a credit card number is not as easily accessible or plainly visible to potential thieves. A necessary or remaining portion of the credit card number residing on the covering remains secure in the possession of the user while a card component is removed to complete a transaction. Accordingly, the card component that is formed with a magnetic stripe can be swiped for transactions and purchases but contain only a portion of a credit card number to avoid skimming of the account number which would otherwise appear completely on a typical credit card.

In yet another embodiment of the invention, a separable credit card may be provided wherein a covering component displays portions of multiple account numbers, and a card component displays the remaining portions of such multiple account numbers. The covering component may be formed with a viewing pane that allows viewing of the remaining portions of multiple account numbers from the underlying card component. Accordingly, complete account numbers are visibly displayed when both components are combined.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

DETAILED DESCRIPTION OF INVENTION

While preferable embodiments of the invention are shown and described herein, it will be apparent to those skilled in the art that such embodiments are provided by way of example only. Numerous variations, changes, and substitutions will occur to those skilled in the art without departing from the scope of the invention. It should be understood that such alternatives to embodiments of the invention described herein may be employed in practicing the invention.

Figure 1:
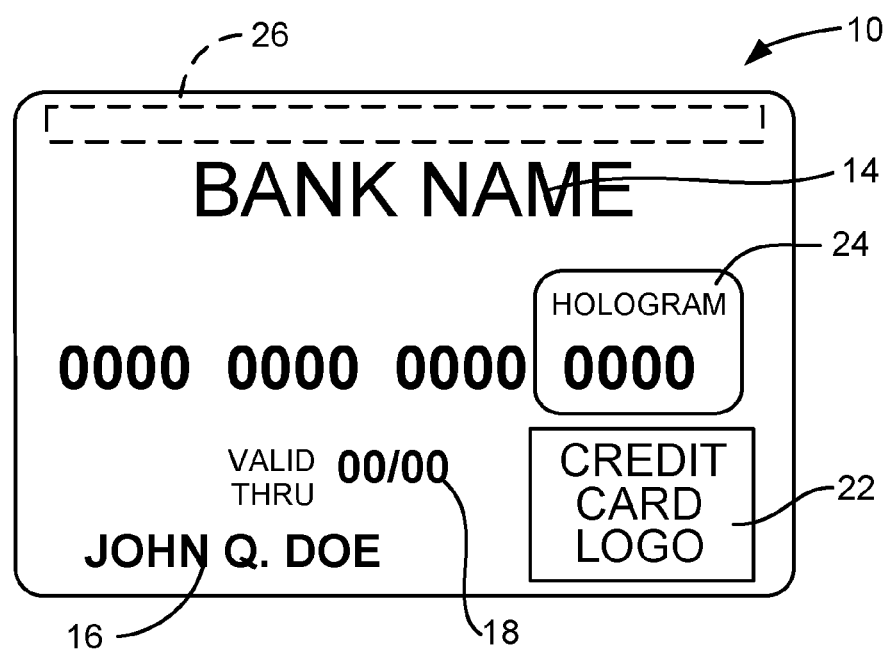
FIG. 1 is a front view of a conventional credit card containing front card information and a complete credit card number.

FIG. 1 is a conventional credit card 10 containing front card information including a complete credit card (account) number 0000 0000 0000 0000. The card 10 may include a magnetic strip 26 located on the top or upper region on the back side of the card. In addition, the front side of the card 10 may display the name 14 of the financial institution or company issuing the credit card. A hologram 24 or other decals or stickers used to make fakes cards more difficult to produce can be found on the front card too. Preferably a portion of the credit card number 0000 is embossed on top of or over the hologram 24. The complete credit card number often appears generally along the middle portion of the front side of card 10. Other information appearing on the front side of a credit card 10 includes the valid thru (expiry) date for the card and the name 16 of the card bearer or account owner 16 towards the bottom portion of the card. A variety of logos or marks 22 which indicate the kind of credit card are s usually displayed on the front of the card also.

Figure 2:
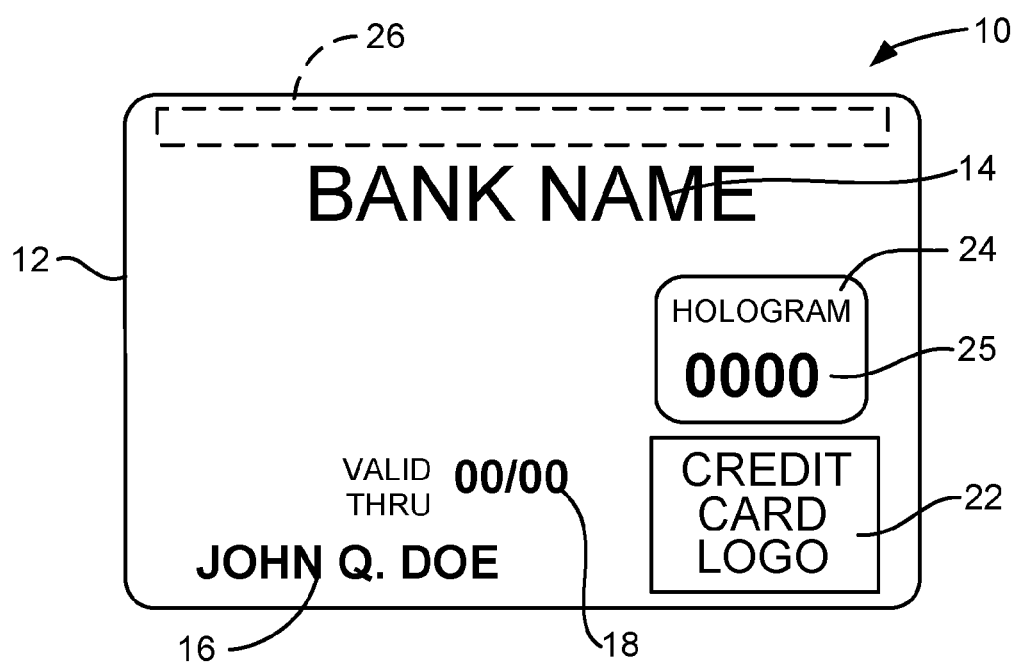
FIG. 2 is a front view of a card portion containing partial account information provided in accordance with an embodiment of the invention.

FIG. 2 illustrates a credit card portion provided in accordance with the invention that may be formed with a plastic body or other kinds of materials used for credit cards. As with conventional credit cards as illustrated in FIG. 1, a variety of imprinted or embossed items or information can be similarly provided thereon such as the identity of an issuing bank, the name of a credit card holder, a credit card expiration date and optionally a credit card logo. In addition, a hologram can be imprinted over at least a portion of the partial account number 25 to make tampering and alteration of the credit card portion more obvious to detect and difficult to accomplish. Although described as a "credit card portion" with respect to this embodiment of the invention, it shall be understood that this could be referred to plainly as a "credit card" interchangeably herein.

Furthermore, a partial credit card account number 25 is provided on the front side of the card in accordance with the invention as shown in FIG. 2. On the back of the card portion, there can be formed thereon an electro-magnetic data strip. This card portion alone may not be used with typical credit card embossing machines in this embodiment of the invention since it contains only a partial credit card account number. The card visibly contains only partial account information and may not be used to transact manual transactions. But the card can still be used securely for authorizing transactions electronically, which is likely the most common means to complete a credit card transactions today or how most purchases are made by users when present. The card with a visible partial credit card account number can be swiped through traditional electronic apparatus so that the magnetic strip conveys the credit card account information for approval electronically.

The cards containing only partial credit card account information herein provides added security. There are many occasions when an individual releases possession of a credit card to conduct a transaction or activity. Traditional credit cards display the complete account number and all other information plainly on the front face of the card. The credit card number in its entirety can be misappropriated by memorizing or copying (skimming) the front card information or series of numbers. Meanwhile, the cards provided herein preferably include "partial" account numbers or information and do not contain "complete" account numbers or any selected front/back card information thereon. Because most credit card transactions today are efficiently and quickly conducted by swiping a credit card through a point of sale terminal or electronic card reading apparatus, the cards herein can be used to complete transactions without exposing complete account information.

Furthermore, the partial account information appearing on the credit card is plainly visible and can be compared by a merchant to an authorization receipt or document. For example, a bartender or server can compare and confirm that the series of digits or characters matches with partial account information that may be electronically read and printed on a receipt after the card is swiped. For example, the last four digits of a credit card number (XXXXXXXX1234) that is electronically read and printed on a customer receipt or bill can be compared to and confirmed by the partial account information that is humanly readable on the face of the card portion (XXXXXXXX1234). Other electronically read and displayed information from the magnetic stripe (holder name, bank name, expiration date, credit card verification numbers, type of credit card—American Express, Visa, MasterCard, Discover) can be compared to the visible information appearing on the face of the card portion to further or better validate the credit card.

Figure 3:
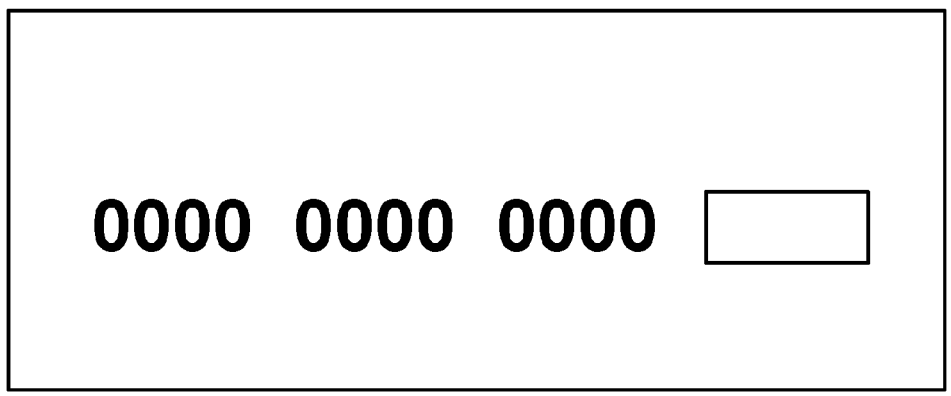
FIG. 3 is a front view of a sheath portion containing remaining account information that is formed with an opening.

FIG. 3 illustrates a sheath portion provided in accordance with the invention. As with a credit card portion shown in FIG. 2, the sheath may include only partial account information (0000 0000 0000 - - - -). Other remaining account information (last four digits 0000) residing on an enclosed card portion can visibly appear through a cut-out portion or window formed in the sheath portion when placed together. Again most merchants can still perform a credit card swipe for a transaction without complete credit card account information appearing on the face of the card. So the sheath portion can remain in the wallet or possession of a customer, while the card portion can be taken out and released into the custody of a merchant or the agent or employee of such merchant (however, if the electronically functional card component is lost or stolen then the card may be similarly used by another in making unauthorized transactions which is already an inherent security risk with current credit cards to be guarded against). The card portion can be swiped by the merchant and run through an automated verification system (AVS) or electronic verification system (EVS). Data from the card portion can be obtained through the magnetic stripe, barcode, chip (smartcard) or other adopted electronic based medium. The sheath portion, which contains remaining account information, is not needed for the card swipe and remains with the customer. It shall be understood that any of the sheath portions herein include credit card "skins" or decorative skins with decals, personalized designs and advertisements.

For example, when a customer enters a bar or drinking establishment to open a tab, a credit card portion as provided herein can be relinquished to a bartender or server. While the card may be legitimately swiped for to pay a bill eventually, the entire credit card number remains secured while the card portion with partial account information is out of the possession of the customer. Even if untrustworthy staff, fellow customers, thieves or others come into the possession of the card or are otherwise able to view the account information, they would at best only be able to obtain partial account information which would be of limited value or useless (a first portion of a numerical key). The rest of the account information residing on the sheath portion would be remain secure and in the wallet or possession of the customer (a second complementary portion of a numerical key).

Figure 4:
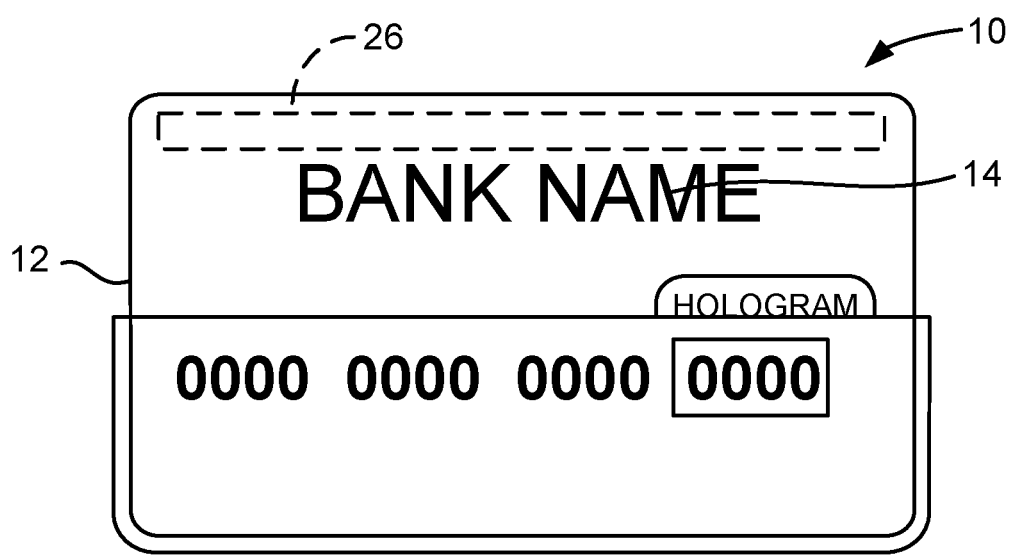
FIG. 4 is a front view of a sheath portion and a card portion, whereby partial account information on the card portion is visible through the opening of the sheath portion which together provides a credit card with the complete account information appearing thereon.

FIG. 4 illustrates a complete credit card provided in accordance with the invention that can by used to conduct both electronic and non-electronic transactions. The credit card may include a separable sleeve portion and a card portion, whereby partial account information on the card portion is visible through the opening of the sleeve portion which together provide a complete credit card with the entire account information plainly visible thereon.

In particular situations, a customer may elect or be asked to present both the credit card and sleeve portion together. For example, when a merchant uses a mechanical credit card imprint apparatus, the customer can present both portions. This instance would call for the entire credit card account information to be provided in human readable format. The credit card and sleeve are preferably formed so their overall size and dimensions are substantially the same as conventional credit cards. This will allow the separable credit cards provided herein to fit into the slots and groves commonly found in credit card imprint apparatus. In some embodiments of the invention, the sleeve may be formed with a back side that fully covers the back side of the credit card. This may protect the magnetic stripe of the credit card from damage. Other embodiments may include sleeves that enclose or substantially cover a selected front region, e.g., bottom half, of the card that usually displays a credit card account number and/or a selected back region, e.g. bottom half or whole backside.

Similarly, in other situations where the holder of a credit card wants to use both the credit card portion and sheath together in an electronic card reading apparatus, the magnetic stripe on the back side of the credit card can be swiped. In some embodiments of the invention, the sheath may be formed with a backing or backside that does not fully cover the back side of the credit card thereby leaving the magnetic stripe exposed. This can allow the separable credit cards provided herein to fit into the slots and groves commonly found in credit card reading apparatus. For example, the card and sheath can together slide into the credit card readers used at gasoline stations offer pay-at-the-pump options. Both portions can remain together and swiped also in card readers used by merchants connected to a credit card authorization network whereby cards are held by hand and swiped sideways or upside down. Alternatively, the fully functional magnetic stripe of the credit card can be de-coupled from the display of the full credit card account number or information. Only when the credit card is combined or coupled together with the sheath is the complete account number visibly provided.

It shall be understood that cards provided herein may confirm to standards setting bodies or card standards such as international standard ISO 7810, including the commonly used ID-1 format, ID-2, ID-3 and ID-1000 formats. The ID-1 format specifies a size of 85.60×53.98 mm (3.370× 2.125 in). It is commonly used for banking cards (ATM cards, credit cards, debit cards, etc.) and also for driving licenses in many countries, including the United States, Canada, Australia, New Zealand, Norway, and European Union countries. This format is also used as a personal identity card in some other countries like Chile, Pakistan, Peru or Switzerland, in retail loyalty cards, and it is one fairly common format for business cards. In general, the proportion of sides is 1.5858, smaller than golden ratio (1.618:1). Other related formats include ISO 7813 which defines additional characteristics of ID-1 plastic banking cards. For example, having a thickness of 0.76 mm and corners rounded with a radius of 3.18 mm. ISO 7811 defines traditional techniques for recording data on ID-1 identification cards, namely embossed characters and several different magnetic recording formats. ISO 7816 defines ID-1 identification cards with an embedded chip (smartcard) and contact surfaces for power, clock, reset and serial-data signals. ISO 14443 defines identification cards with an embedded chip (proximity card) and a magnetic loop antenna that operates at 13.56 MHz (RFID). More recent International Civil Aviation Organization (ICAO) standards for Machine Readable Travel Documents (MRTDs) specify a cryptographically signed file format and authentication protocol for storing biometric features (photos of face, fingerprint and/or iris) in ISO 14443 RFID chips. These and other card formats may be applied to the invention herein.

In preferable embodiments of the invention, the magnetic stripe on the back of a card portion is still functional and can be swiped through electronic credit card readers when the card portion is combined or separated from the sheath portion (see FIG. 3). Preferably, the sheath portions are formed with a paper or plastic material having a total thickness of less than or equal to 0.5 cm, 0.4 cm, 0.3 cm or 0.2 cm. A sheath with a relatively thinner thickness will more likely slide into or through electronic/magnetic card reading apparatus. However the sheath is preferably durable enough and of sufficient thickness to withstand a printing or embossing process that places partial account or credit card information thereon. The sheaths (or coverings/sleeves) provided in accordance with the invention herein can be formed from a variety of materials including plastics and different kinds of papers. In some embodiments, sheathes can be formed with Tyvek (DuPont) that is known to protect the magnetic information contained within the stripe. While the sheath in these illustrated embodiment of the invention may be formed to cover only a portion of the card portion, it shall be understood that the entire card may be covered or protected in other embodiments of the invention (see generally FIGS. 7A-C).

Additional aspects of the invention provide a multi-component personal card that can be carried by an individual. While some part(s) of the card can be released from the possession of the individual to third parties to relay information or authorize a transaction, a remaining part of the card can remain safely behind. As described with other aspects of the invention related to credit cards, many concepts provided in accordance with the invention can be applied to other kinds of cards carried by individuals such as a debit card, gift cards, personal identification, drivers licenses, passes membership cards. These and other kinds of cards carrying personal or sensitive information usually carried by individuals in wallets, purses or other card holding devices can also be protected by the invention. In addition, the multi-component cards provided herein can be formed of two or more parts each carrying a portion of the entire information for one or more accounts normally displayed on the front and back of a card. It shall be understood however that many of the preferred embodiments illustrated herein provide two-piece cards that can be carried by the individual in a manner like any other card.

Figure 5:
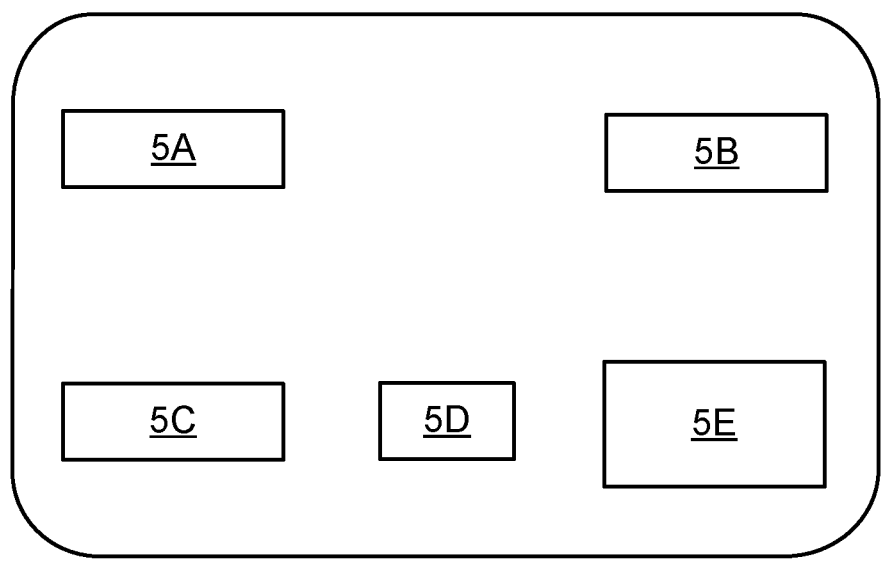
FIG. 5 illustrates a user account card having one or more regions for displaying partial account information and/or complete account information.
Figure 6:
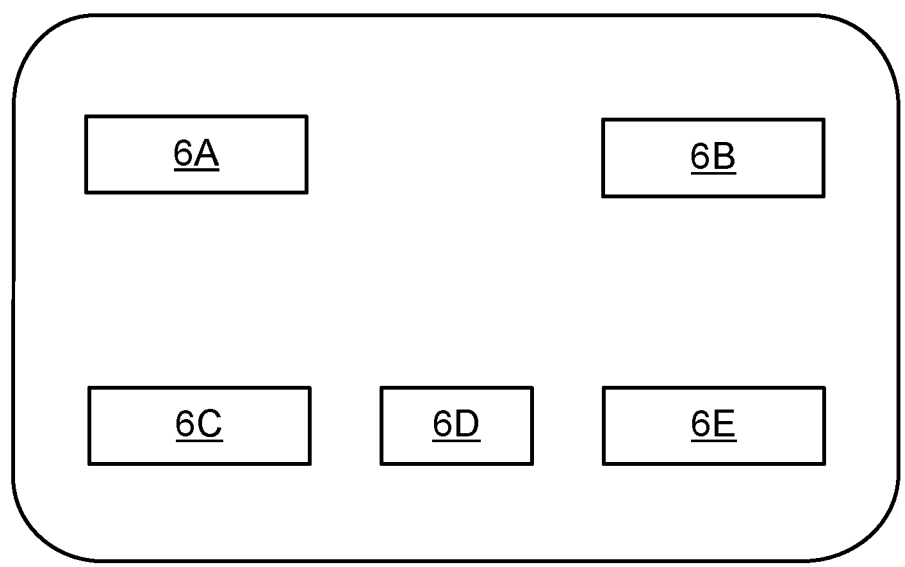
FIG. 6 illustrates a covering for enclosing or mating with the user account card in FIG. 5 having one or more regions for displaying partial account information and/or cut-out regions or openings that correspond to and allow for the display of partial account information appearing on the user account card.

For example, another two piece embodiment of the invention is described in FIGS. 5-6. FIG. 5 illustrates a user account card having one or more sections (5A-5E) for displaying partial and/or complete card (account) information. FIG. 6 illustrates a skin or covering for mating with the card in FIG. 5 which can also have one or more section (6A-6E) for displaying partial card (account) information and/or cut-out regions or openings. The cut-out regions formed in the skin can correspond to and allow for the display of partial information appearing on the card therein.

For example, FIG. 5 can represent a front/back card of the user account card, and FIG. 6 can represent a corresponding separable front/back skin. The card can be at least partially enclosed within the skin as with other described embodiments of the invention herein. Both can be configured and designed to cooperate with each other to provide a card visibly displaying complete card information when combined. However when separated, each may only contain and display partial card information thus providing security of the card when the card or sleeve is released from the physical possession of the user.

For preferable embodiments of the invention, 5A and 5B may be two (or more subdivided) sections within a first designated card region for displaying selected information (including but not limited to an account number appearing on the front of a credit card), while 6A and 6B may be two (or more subdivided) sections of a designated skin region corresponding the selected information. The entire credit card number can be divided into two parts and imprinted or embossed on the card and skin. A first part of the credit card number can be located in section 5B, while the second part of the credit card number can be located in section 6A. In this example, sections 5A and 6B would not form any part of the entire and true credit card number and could thus be left blank, cut-out or formed as an opening, crossed-out (XXX) and/or contain dummy or fake numbers or characters. When the card is inserted into the skin, the first part of the credit card number in section 5B can therefore appear through a window formed in section 6B and visually combined together with the second part of the credit card number appearing in section 6A of the skin. As described elsewhere herein, the card can be formed with a magnetic stripe formed on the opposite side of the card to conduct electronic based transactions and swiping while maintaining secure the selected information such as an entire credit card number. It shall be understood that other card information appearing on the front/back of the card can be secured in this manner.

In preferable embodiments of the invention, section 6A of the skin can include part of a series of imprinted or embossed numbers according to the number of digits and sequence adopted by Visa or MasterCard, AAAA BBBB CCCC - - - -. Section 5B of the card can include the remaining last four digits DDDD which appear through the window formed in section 6B of the skin.

In other preferable embodiments of the invention, section 6A of the skin can include part of a series of imprinted or embossed numbers according the number of digits and sequence adopted by American Express, 1111 222222. Section 5B of the card can include the remaining last five digits 33333 which appear through the window formed in section 6B of the skin.

In additional embodiments of the invention, the entire series of imprinted or embossed numbers can be included on only either the card or the skin. For certain situations, a person may not want to release a card containing any portion of an account number. The card sections 5A and 5B could thus remain blank, masked, crossed-out (XXX) or contain fake numbers. Meanwhile the card having a magnetic stripe (computer chip, barcode etc.) can be removed from the skin in order to complete an electronic based transaction regardless of the validity or presence of information displayed in sections 5A and 5B. At the same time, if needed upon request or on demand, the skin and card may be presented together such that the skin sections 6A and 6B display the entire account number. As with other embodiments of the invention herein, other information or indicia displayed on the card/skin portions can be used to authenticate or validate the card or bearer, and/or otherwise confirm that the card and skin portions match each other.

As shown in FIGS. 5-6, the card and skin may include other designated and corresponding card and skin regions for displaying selected information. For example, the sections C, D and E sections in FIGS. 5-6 can provide security and verification of other card or account information. Each or either sections may contain the name and/or signature of the card holder, a valid thru (expiry) date, credit card logos, holograms or any other indicia/information appearing on the front or back side of the card. For example, this card/skin information can be compared to the printout and authorization information displayed on a MERCHANT COPY of a receipt or a CUSTOMER RECEIPT. Other information that can be provided on the front and/or back side of the card and/or skin include security features for credit or debit card transactions that are used to increase protection against credit card fraud. These include a Card Security Code (CSC), sometimes called Card Verification Value (CVV or CV2), Card Verification Value Code (CVVC), Card Verification Code (CVC), Verification Code (V-Code or V Code), or Card Code Verification (CCV). In particular, there are several common types of security codes: CVC1 or CVV1 (encoded on the magnetic stripe of the card and used for transactions in person); CVV2 or CVC2 (also known as a CCID or Credit Card ID, and is often asked for by merchants for them to secure "card not present" transactions occurring over the Internet, by mail, fax or over the phone); and contactless card and chip cards may supply their own codes generated electronically, such as iCVV or Dynamic CVV.

Moreover, sections 5C-E and sections 6C-E may be designed to cooperate such that information printed or displayed on any of the card sections 5C-E and visibly seen through corresponding windows or openings formed in skin sections 6C-E. Alternatively, only some or all information can be embossed or shown on any of the skin sections 6C-E, which can remain in the possession of the owner when releasing a card formed with a magnetic strip, chip, barcode/ barcoding, or other means which information can be electronically or optically read or scanned. The corresponding card sections 5C-E in this embodiment could be left blank, masked, crossed-out (XXX) or include fake characters. It shall be understood that any of the aforementioned information and electronic enabling technologies can be located on either the card or skin (sleeve) portions interchangeably as with other embodiments of the invention described herein.

Another aspect of the invention provides methods and apparatus for retrofitting or modifying existing cards to secure displayed information on its front/back face. For example, an adhesive mask can be placed over portions of the displayed information on an issued card such as an account number or credit card number (see FIG. 1). As a result, such cards which are usually formed with magnetic stripes or barcode can still be fully operational but do not openly display account information (see FIG. 2). In accordance with this aspect of the invention, a card issuing bank or financial institution can have at least the options of: (1) producing and issuing secured credit cards, debit cards or ATM cards with corresponding sleeve or skins described elsewhere herein; or (2) delivering to customers or account members a "kit" with a mask to partially cover credit card or account numbers or other displayed information on a card, plus a new sleeve or skin with embossed or imprinted account numbers matching the credit card or account numbers to be covered by the adhesive mask (which can be delivered or mailed together or separately which can provided additional security against theft or risk of loss).

In preferable embodiments of the invention, the masks can be self adhesive or applied when needed. They are preferably formed with a thin layer of material that will make it easier to slide the retrofitted card into a sleeve. At the same time, the mask material is preferably thick enough to adequately hide the numbers or information underneath. The material may be tacky or spongy with an adhesive layer so that outlines or impressions of numbers or characters underneath are not visible. The mask can be also formed with a tamper evident tape so it will become apparent to the owner that attempts were made to pull off the mask to gain access to the underlying card information. A variety of patterns, numbers, characters, or logos (AMERICAN EXPRESS) can be imprinted on the mask too.

In addition, a sleeve or skin containing the portions of card information described elsewhere herein can be used together with a retrofitted card. For example, FIG. 5 may be used as an example here of an existing or already issued card. Sections 5A and 5B together provide a complete account number. In accordance with this aspect of the invention, a card issuing institution or holder himself can provide or obtain additional security by masking section 5A of the card with a mask or tamper resistant or evident tape. This would allow information in section 5B to be visible yet protect the holder when the card is released to third parties in accordance with the invention. In addition, a corresponding matching sleeve as shown in FIG. 6 can be provided with a section 6A that contains the same information masked in region 5A. Section 6B could be formed with a cut-out window through which section 5B is visible. When combined and as needed, the card and sleeve displays full account information in sections 6A and 5B. Accordingly, an existing card can be retrofitted in accordance with the invention to avoid waste yet provide immediate added security with existing cards and/or until a card issuing entity has sufficient time to produce and deliver cards provided in accordance with the invention.

Figure 7A:
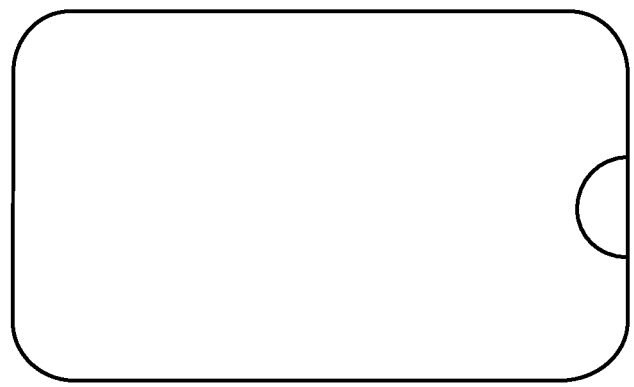
FIG. 7A-C illustrates sleeves that may contain or house a variety of cards provided herein that include account information in accordance with an aspect of the invention.
Figure 7B:
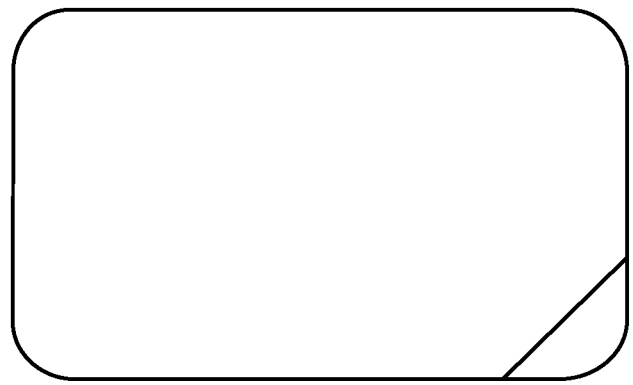
Figure 7C:
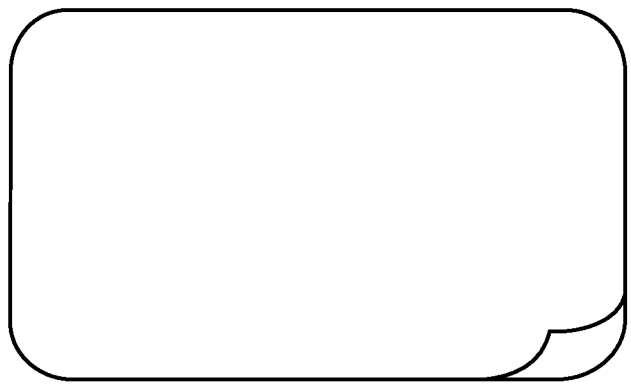

FIG. 7A-C illustrates sleeves that may be configured according to principles of the invention and contain or house a variety of cards provided herein. The sleeves can include complete or partial account information or any other visible information (or none at all) appearing on personal cards carried by a user as described elsewhere. Many embodiments of the invention provide sleeves that can be conveniently placed inside a wallet or other card holding case or device. A sleeve can be formed for wallets having with slots or compartments that allow removal of a card from the top or in an upward manner, in accordance with an aspect of the invention (see FIGS. 3-4). Other embodiments allow for removal of a card sideways, as shown in FIGS. 7A-C. FIG. 7A shows a sleeve formed with a thumb slot to more easily grasp a card enclosed therein. In FIG. 7B, an embodiment is shown having a corner cut-out. FIG. 7C illustrates an embodiment whereby the sleeve substantially surrounds an enclosed card but is foldable at a corner to permit access thereto. In any of these illustrated embodiments, the sleeve may be formed with a front side and a back side bonded or attached together at one or more seams formed along the left side, top side and/or bottom side of the sleeve. At least one of such sides is joined, and at least one of such sides should remain open to allow access to a card.

Concepts of the invention can be implemented with other credit card systems and methods such as those described in U.S. Pat. No. 5,326,964 (Risser), U.S. Pat. No. 3,446,260 (Osher), U.S. Pat. No. 5,941,375 (Kamens), U.S. Pat. No. 6,715,795 (Klure), U.S. Pat. No. 6,899,276 (Limelette), which are incorporated by reference herein in their entirety.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A two-part credit card assembly for displaying a complete credit card account number that is arranged into at least three groups of numbers comprising:
   a. a credit card for displaying at least one group of numbers corresponding to the credit card account number, and formed with a magnetic stripe that is readable by a merchant credit card reader; and
   b. a credit card envelope for displaying the at least two remaining groups of numbers corresponding to the credit card account number, and wherein the credit card envelope is formed with an opening or window through which the at least one group of numbers displayed on the credit card corresponding to the credit account number is visible when the credit card is stored within the credit card envelope to together display the complete credit card account number, and further wherein only the at least one group of numbers is visible on the credit card when removed from the credit card envelope to effect a transaction using the magnetic stripe on the credit card thereby visibly protecting the complete credit card account number.

2. The two-part credit card assembly as recited in claim 1 wherein the credit card envelope includes one or more of the following: a name and/or signature of a card holder, a valid thru (expiry) date, a credit card logo, hologram, or a security code that is useable for card not present transactions.

3. The two-part credit card assembly as recited in claim 1 wherein the credit card envelope is configured for placement in a wallet, and is formed of reinforced paper for allowing the credit card to be slidably removed from the credit card envelope thus allowing the credit card envelope to remain in the wallet.

4. A bank issued card comprising:
   a. a magnetically readable card that includes a magnetic stripe on either a front or back side of the card, wherein the card further includes a first part of an imprinted unembossed account number that is printed thereon by a bank issuing the bank card; and
   b. a protective skin that includes a second part of the imprinted unembossed account number that is printed thereon by the bank issuing the bank card, and wherein the protective skin is formed with a top or side opening for slidably receiving the card but leaving exposed the magnetic stripe on the card, and further wherein the protective skin includes a window or opening through which the first part of the account number on the card therein is visible and only together with the second part of the account number on the protective skin provides a complete account number, thereby allowing the magnetic stripe on the card to be swiped by a card reader either together or separately from protective skin.

5. A two-part debit or credit card comprising:
   a. a plastic card portion that displays a first series of digits which correspond to a debit or credit card account number, wherein the plastic card portion further includes a magnetic stripe that can be read by a merchant card reader; and
   b. a sleeve portion for receiving the plastic card portion therein that displays a second series of digits which correspond to the debit or credit card account number, wherein the sleeve portion is formed with an opening through which the first series of digits displayed on the plastic card portion the account number is visible, and wherein
      (i) the first series of digits and the second series of digits are displayed together corresponding to the complete debit or credit card account number when the plastic card portion is at least partially contained within the sleeve portion, and further wherein
      (ii) the complete debit or credit card account number is protected when only the first series of digits which correspond to the debit or credit card account number is visible when the plastic card portion is removed and separated from the sleeve portion to allow the magnetic stripe on the plastic card portion to be swiped or read by the merchant card reader to effect a merchant transaction.

6. The two-part credit card assembly described in claim 1, further comprising: an embedded computer chip in the credit card that can be accessed by point of sale terminal, thereby providing a chip card.

7. The two-part credit card assembly described in claim 6, wherein the computer chip includes an electronically encoded form of a portion of or the complete credit card account number.

8. The two-part credit card assembly described in claim 6, wherein the computer chip generates a code for a particular transaction.

9. The bank issued card described in claim 4, further comprising an embedded computer chip in the credit card that can be accessed by point of sale terminal, thereby providing a chip card.

10. The bank issued card described in claim 9, wherein the computer chip includes an electronically encoded form of a portion of or the complete credit card account number.

11. The bank issued card described in claim 9, wherein the computer chip generates a code for a particular transaction.

12. The two-part debit or credit card described in claim 5, further comprising:
   an embedded computer chip in the credit card that can be accessed by point of sale terminal, thereby providing a chip card.

13. The two-part debit or credit card described in claim 12, wherein the computer chip includes an electronically encoded form of a portion of or the complete credit card account number.

14. The two-part debit or credit card described in claim 12, wherein the computer chip generates a code for a particular transaction.

\* \* \* \* \*